Oct. 21, 1958     B. E. SEARLE     2,857,052
OXIDIZER FILTERS

Filed Nov. 1, 1955     2 Sheets-Sheet 1

INVENTOR.
BOURQUIN E. SEARLE
BY Reuben Wolk
ATTORNEY

Oct. 21, 1958

B. E. SEARLE 2,857,052

OXIDIZER FILTERS

Filed Nov. 1, 1955

INVENTOR.
BOURQUIN E. SEARLE
BY Reuben Wolk
ATTORNEY

United States Patent Office 2,857,052
Patented Oct. 21, 1958

2,857,052
OXIDIZER FILTERS

Bourquin E. Searle, Milwaukee, Wis., assignor to Purolator Products, Inc., Rahway, N. J., a corporation of Delaware Application November 1, 1955, Serial No. 544,227

2 Claims. (Cl. 210—209)

This invention relates to an oxidizer filter, which is a device for oxidizing the iron found in ground water and removing it from the water.

Ground water, which is normally used for industrial and household purposes, contains a large amount of substances that are undesirable either from the standpoint of taste or corrosion of the piping system. By ground water is meant water that has been conveyed through systems or through parts of the earth, in contrast to surface water that stands in lakes or reservoirs. One of the most undesirable of these substances is iron which is present in ground water in large quantities. This iron may be efficiently removed by exposing the water to an air stream, causing the iron to oxidize into substances such as $FeO_2$ or $Fe_2O_3$ then providing a filter which is sufficiently fine to remove these oxides.

It is the primary purpose of this invention to provide a device for removing the iron in water.

A further purpose of this invention is the provision of a filter unit which will remove the resulting oxides.

An additional object of this invention is to provide a device that will be simple in construction and will possess long life.

A further object of this invention is to provide a filter element that may be quickly and simply replaced.

Other objects and features of this invention will be apparent from the following description and drawing in which.

Figure 1:
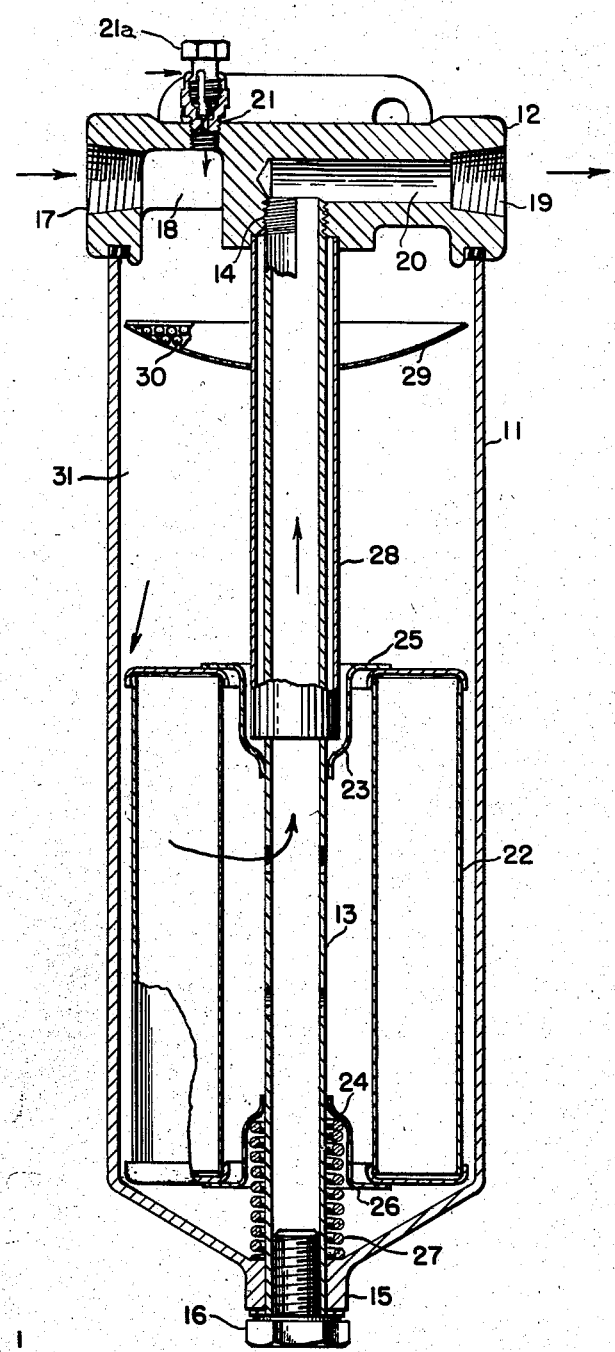
Figure 1 is a vertical cross-sectional view of a device illustrating the preferred form of my invention.

Turning now to Figure 1, the device comprises a main housing 11 which is generally cylindrical in shape. A cover 12 is mounted on the top of the housing and is fastened to it by means of a hollow center tube 13 which is threaded at its upper end. The upper end of the tube is screwed into a threaded center opening 14 of the cover 12 and its other end passes through a boss 15 at the lower end of the housing. A bolt 16 is brazed into the lower end of the tube to plug the lower end of the tube and also enable the cover to be tightened on the housing when the cover is screwed tightly onto the threaded upper end of said tube 13. The cover 12 includes a threaded inlet 17 leading to a chamber 18 which is open to the inner portion of the housing 11. The cover also includes a threaded outlet 19 which is open to a passage 20 leading to the threaded center opening 14 of the cover so that the assembly of the tube 13 with the cover forms a continuous passage from the tube to the passage 20. A threaded aperture 21 is located in the upper surface of the cover, into which is inserted an automatic inlet valve 21a of conventional design, capable of allowing atmosphere to enter the cover. In the lower portion of the housing a filter element 22 is mounted concentrically about the center tube. This element is preferably of the cylindrical convoluted resin-impregnated type shown in the patent to Bell, Patent Number 2,642,187, although other types of filter elements well known in the art may be used. The element is mounted on the center tube by means of an upper cup 23 and a lower cup 24 mounted on the opposite ends of the element. The cup 23 includes a flange 25 which contacts the upper end of the element while the cup 24 includes a flange 26 which contacts the lower end of the element. The cups are placed concentrically around the center tube 13 without fastening and provide a guide and sealing means for the element. The element is maintained in a proper relationship with the bottom of the housing by means of a compression spring 27 which is located concentrically around the lower end of the center tube between the boss 15 and the cup 24. The element is further supported by means of a tube 28 which is placed concentrically about the upper portion of the center tube 13 and is held between the upper cup 23 and the cover 12. An impingement plate 29 is welded or otherwise permanently fastened to the upper portion of the tube 28; this plate is upwardly concave and contains perforations 30 throughout its surface. The plate has an aperture through the center enabling the tube 28 to pass through it and has a diameter which extends almost the diameter of the housing 11.

Operation

The operation of the device is as follows:

The water which is to be treated enters the filter through the inlet 17, passes through the chamber 18, and into the interior of the housing 11. The water impinges against the plate 29 and is broken up into tiny droplets at this point due to a combination of the impingement and the effect of the perforations 30 in the plate, while the concave shape of the plate affords a maximum area for impingement. At the same time air is aspirated through the valve 21a by the action of water flowing through the chamber 18 and enters the cover 12 through aperture 21. The air strikes the droplets of water and reacts with the iron present to create ferrous oxide or ferric oxide which are precipitated from the water. The water and oxides rapidly fill the lower portion of the housing 11 while air fills the upper portion. The water thereafter passes through the filter element 22, into the center tube 13 and passage 20, and out of the cover by means of outlet 19, and then to its ultimate destination. The oxide particles are trapped by the filter element 22, thus providing clean water at the outlet 19. As the water continues to enter the housing, air is also injected and continues the oxidation process. The check valve 21a may be set at a predetermined value in order to ensure that sufficient air is always present in the housing to give proper oxidation.

The filter element used in the invention must be capable of removing particles which are very small, in the 1 to 10 micron range. This is necessary not only because of the size of oxide particles but because the small pores in the filters enable these particles to build up on the surface of the filter element very rapidly and improve the operation of the system. The resultant build-up is similar to the conventional practice of adding filter aid to filters.

Modification

Figure 2:
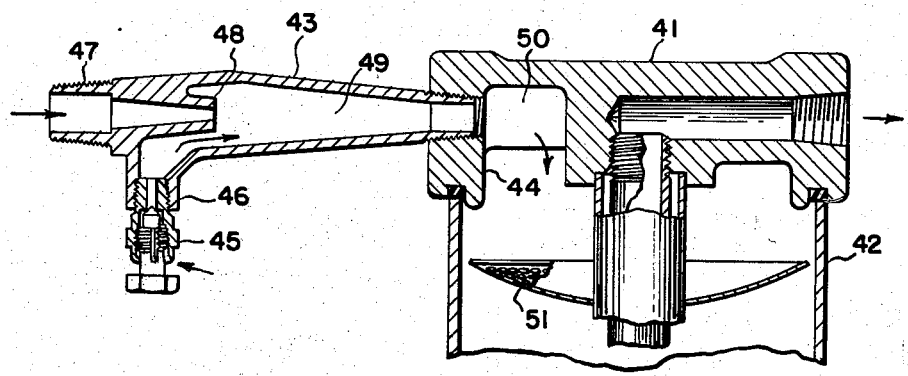
Figure 2 is a vertical cross-sectional view of a portion of the device of Figure 1 illustrating a modified form of my invention.

A modified form of the invention is illustrated in Figure 2, in which the housing 42 is identical to the housing 11 of the principal form, while the cover 41 is similar to the cover 12 of the principal form except for the elimination of aperture 21. The valve 21a is also eliminated. Instead, an injector 43 of conventional design is inserted in the inlet 44 of the cover, and a check valve 45, similar to the check valve 21a, is inserted in the air inlet 46 of the injector.

The water enters the injector at its entrance 47 and flows through the venturi 48 and chamber 49 into inlet 44 of the cover. The flow of the water aspirates air through the check valve 45 and into the chamber 49, where it is mixed with the water. The mixture of air and water then flows into chamber 50 of the cover, where it undergoes the same process as before. In this case, the air-water mixture impinges on plate 51.

The resulting oxidation taking place in each form of the invention is identical, since it is only a choice of mixing the air and water in the chamber 18 in the first case, or in the chamber 49 in the second case.

Thus it can be seen that I have provided a device for removing undesirable iron from water by the process of oxidation followed by a high degree of filtration. The oxidation has been accomplished by impinging the water against a perforated plate to break it into small droplets and exposing it to a stream of air, thus converting the iron into iron oxides.

My invention is not limited to the specific configurations shown, but modifications may be made within the spirit of my invention.

I claim:

1. A device for removing iron from water by oxidation comprising a cylindrical housing, a cover for said housing having a water and air inlet and an outlet, said inlet communicating with the interior of said housing, a center tube extending axially of the housing and communicating at its upper end with said outlet, a filter element removably supported on said center tube, a second tube surrounding said center tube and disposed between said cover and said filter element, an impingement member secured to said second tube and positioned to be impinged upon by water and air admitted to said housing in said cover to break the said water up into droplets to facilitate oxidation from the water of its iron content by air entering the housing with the water, sealing and centering members at opposite ends of said filter element which are movable slidably on said center tube, said second tube providing an abutment for one of said sealing and centering members at one end of said filter element, and spring means on said center tube at the other end of said filter element for engaging a second of said sealing and centering members and thereby biasing the element toward said abutment.

2. A device for removing iron from water by oxidation comprising a cylindrical housing, a cover for said housing having water and air inlets and an outlet, the water and air inlets communicating with the interior of said housing, a center tube extending axially of the housing for the full length of the latter and having its upper end communicating with the outlet in said cover, plug means for the lower end of said center tube, a filter element removably supported on said center tube within the housing, sealing and centering members for said filter element disposed on said center tube at opposite ends of said filter element, a second tube surrounding the center tube and being disposed between the cover and the sealing and centering member at one end of said filter element, a biasing spring on said center tube extending between the sealing and centering member at the second end of said filter element and said housing, said biasing spring serving to maintain sealing engagement between the sealing and centering members and the respective ends of the filter element, and impingement means carried by said second tube and positioned between the cover and said filter element to intercept water admitted to said housing via said cover and break it into droplets to facilitate oxidizing action on the iron content of the water droplets by the air admitted to said housing.

References Cited in the file of this patent

UNITED STATES PATENTS

| 326,221 | Hyatt | Sept. 15, 1885 |
| 2,200,580 | Pruss et al. | May 14, 1940 |

FOREIGN PATENTS

| 411,227 | Italy | 1945 |